United States Patent Office 3,132,563
Patented May 12, 1964

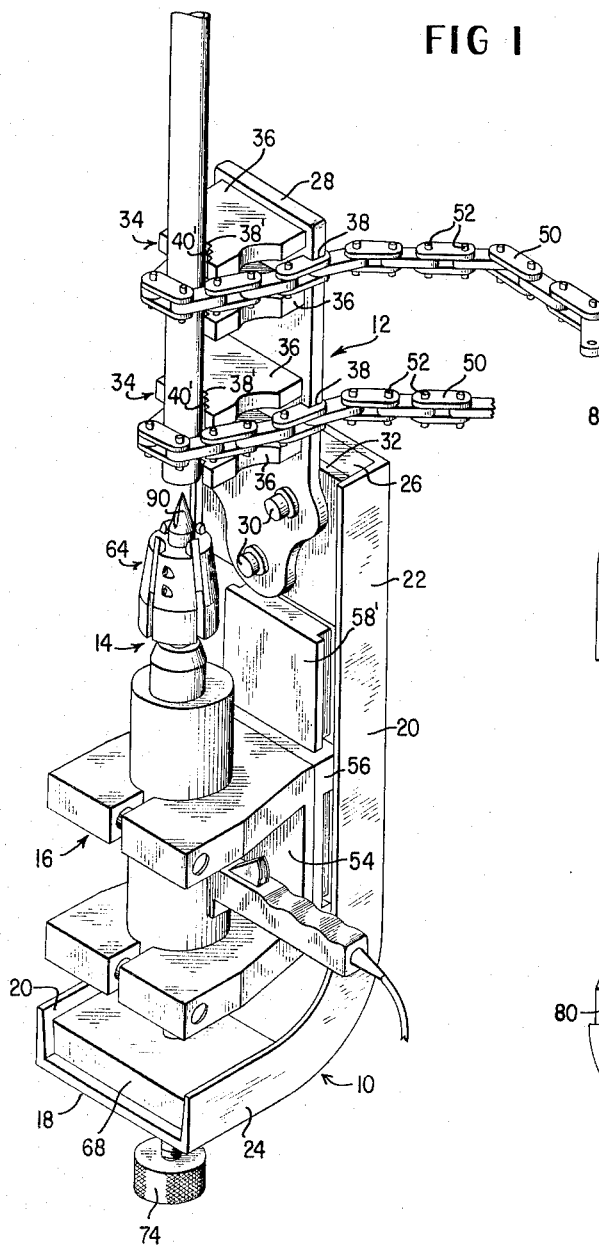
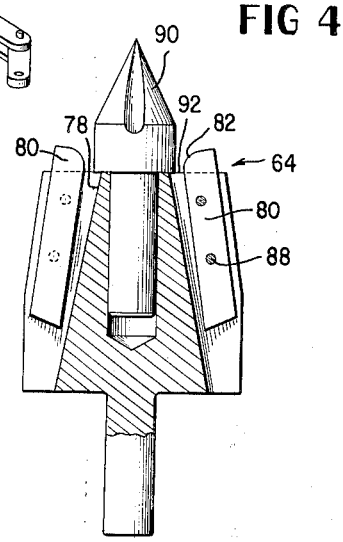
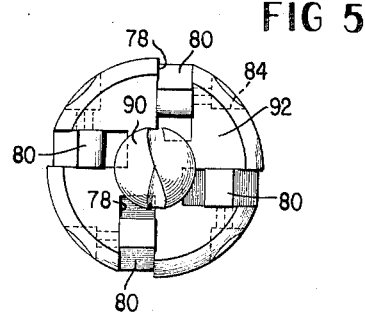
INVENTOR.
CARLTON S. BARNUM
BY Hall & Houghton
ATTORNEY

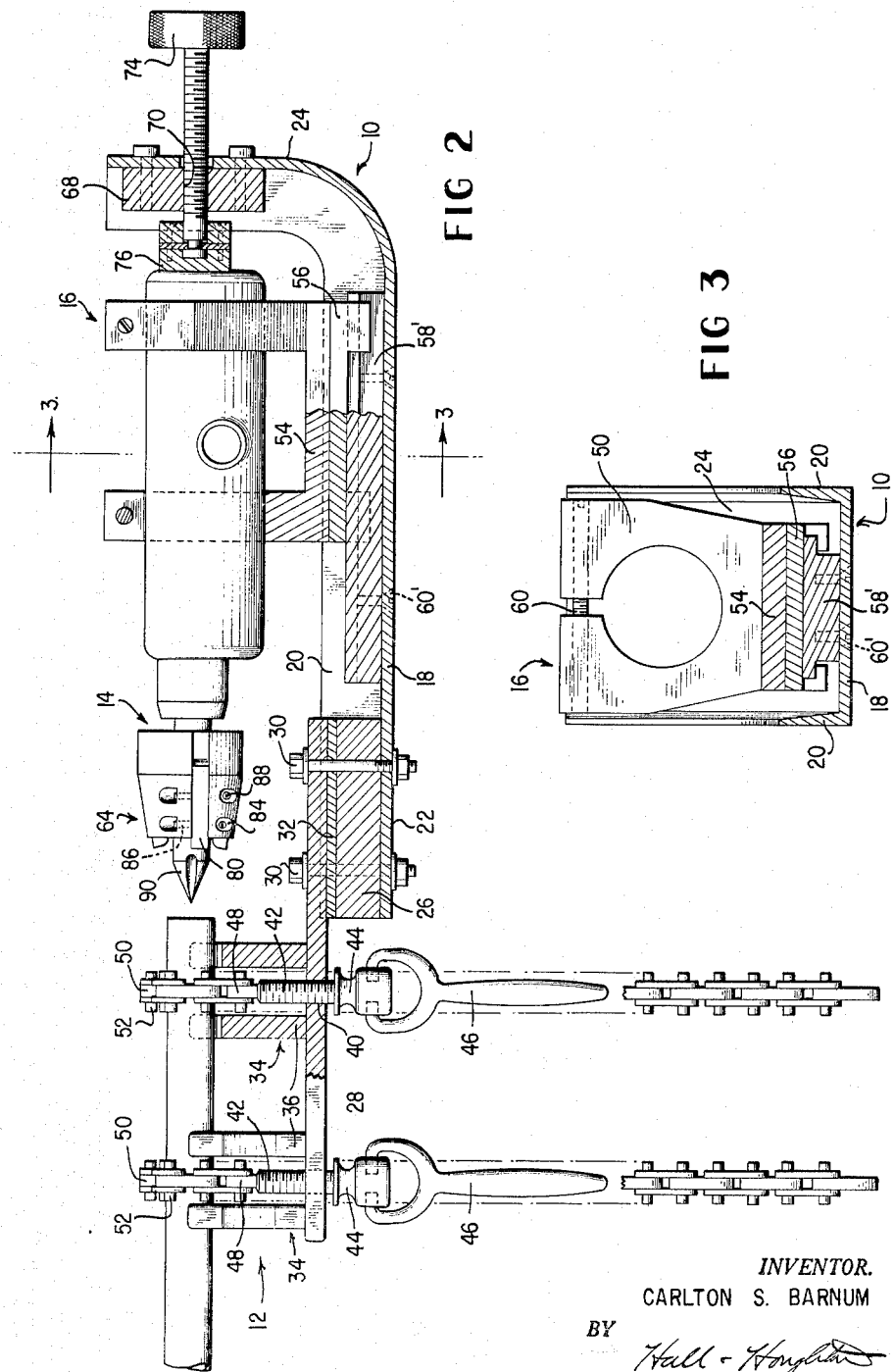

3,132,563
PIPE CUTTING TOOL
Carlton S. Barnum, MD 16 Balmville Terrace,
Newburgh, N.Y.
Filed July 18, 1961, Ser. No. 124,932
8 Claims. (Cl. 90—12)

The present invention relates generally to pipe cutting tools, and more particularly to a tool for externally beveling or otherwise preparing the ends of tubes or pipes for welding.

In the past, when it was necessary to weld the ends of pipes together, the beveling of the pipe ends, which is common practice in welding, had to be performed in a shop. Thus, the pipes were necessarily first transported to the shop after being cut to their required length, or it was necessary to provide a lathe on the construction site. This has been particularly true of constructions utilizing steel pipes, which are much more difficult to cut than copper or cast iron pipes. The provision of a lathe on a job site, or the transportation of huge quantities of pipes to a machine shop for beveling purposes, was quite an expensive and time consuming operation. For, even with a lathe at the job site it is necessary that the pipes first be brought to the lathe station for beveling before they can be connected to a piping system. Difficulties arise quite often even when using lathes. For whenever the weld is not proper or is not sufficiently strong, it has to be repeated. In such an event, the ends of the pipe must be refaced, but usually the pipe has already been connected into a piping system.

The only portable pipe cutting machines which have been available, have not been sufficiently powerful to work on stainless steel pipe or other types of hard metal pipes such as carbon steel and the like. The pipe cutting tools which have previously been available, if they were portable, were seldom power driven, and if power driven were not of sufficient speed for use in large construction projects. Furthermore, they were not capable of use selectively in vertical and horizontal positions. Also, none of the prior art devices have a plurality of clamps built into the tool construction so that a pipe to be worked upon may be positively and accurately clamped in position. Also with these devices there is no provision for cutting a pipe while it is mounted into a fitting of a piping system.

With these defects of the prior art in mind, it is a main object of this invention to provide a portable power driven tool which may be used selectively in a stationary vise, or in a portable manner so that it may be connected to an installed pipe.

Another object of this invention is to provide a pipe cutting tool which may be clamped onto an installed pipe and which will accurately cut or face the end of a pipe to be worked upon.

A further object of this invention is to provide a pipe cutting machine wherein the device operates at such high speed that manual feeding of the cutter may be performed in an expeditious manner, to eliminate the need for power feed and reduce the overall weight of the device.

These objects and others ancillary thereto are accomplished according to a preferred embodiment of the invention wherein a frame is provided which is adapted to be mounted in a stationary vise, such as the type that is found in most machine shops. On one end of the frame a plurality of pipe vises or clamps are mounted in order to hold the end of a pipe which is to be worked upon. Power cutting means such as an electric motor having a cutting head mounted on a driven shaft thereof, is provided and is mounted upon a carriage which is slidable longitudinally of the axis of a pipe mounted in the clamps. The cutting head rotates about this same axis so that the cutting head is always mounted to be coincident with a pipe to be worked upon, and accurate beveling of the pipes is always accomplished. A manually operated adjusting screw is provided in the other end of the frame from the pipe vises, and is connected to the carriage. Thus, turning this screw will slide the carriage toward or away from the pipe vises and either feed or retract a cutting head toward or away, respectively, with respect to the end of a pipe. The cutting head itself has a combination fluted pilot and reamer which is a mandrel that fits within the interior of the pipe and properly centers the cutters. The cutters are mounted in slots in the cutting head, are circularly arranged with the mandrel acting as center, and are longitudinally inclined. Each cutter is adjustable so as to be adaptable to any size and style of welding joint for all types of materials including stainless steel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the tool as mounted upon an installed pipe;

FIG. 2 is a side elevational view of the tool partly in section;

FIG. 3 is a transverse vertical sectional view of the tool taken substantially along the plane defined by line 3—3 of FIG. 2;

FIG. 4 is a vertical sectional view taken through the cutter head proper, and

FIG. 5 is an end elevational view of the cutter head taken substantially along the plane defined by line 5—5 of FIG. 4.

With more particular reference now to the drawings, the portable pipe cutting tool comprising the present invention includes a frame 10 which is of strong structural metal construction to properly support the various components thereof. Mounted on one end of the frame 10 is a pipe vise section 12 for carrying and firmly holding the ends of pipes which are to be cut. Power cutting means 14 is mounted on a carriage 16 for movement toward and away from pipe vise section 12.

Frame 10, preferably constructed of aluminum to lighten the weight thereof, is constructed of U shaped cross section structural metal which includes a web 18 and flanges 20. The frame has a longitudinally extending or horizontal leg 22 and an upstanding or vertical leg 24. A mounting block 26 is disposed within the channel defined between flanges 20 and web 18 at the forwardmost portion of frame leg 22.

The pipe vise section 12 includes a mounting plate 28 which is securely fastened at its rearward end to mounting block 26 by means of bolts 30 passing through plate 28 and into mounting block 26 which is permanently and securely fastened to leg 22 of frame 10. Various thickness shims 32 may be interposed between mounting block 26 and plate 28 to adjust the relative height of plate 28 above web 18, for a purpose which will be explained in detail below. Two aligned pipe vises 34 are mounted on plate 28 spaced from each other and coaxially disposed. These devices include base portions 36 having generally semicircular recesses 38' provided therein and formed with pipe gripping surfaces 40' in the form of small teeth which grip the pipe and prevent movement thereof.

Each pipe vise has two spaced plates 36, and between these plates along one side of plate 28, recesses 38 are provided. On the other side of plate 28, and in transverse alignment with recesses 38, threaded openings 40 are provided into which bolts 42 are threaded, the lower ends of these bolts having collars 44 in which handles 46 are pivotally mounted as shown. An ear 48 is fastened to the upper end of bolt 42 and this in turn is connected to a link chain 50 which is fastened together by means of small projecting bolts 52. Thus chain 50 is connected to ear 48. When it is desired to fasten a pipe within the pipe vises, a pipe is seated within recess 38', and one end of the chain 50 is inserted into recess 38. Now recess 38 is only sufficiently wide to accommodate the links of the chain, but will not accommodate the nuts 52. Thus, when a link is inserted within the recess, an upward pull will force a nut 52 to engage the lower surface of plate 28 and the chain is thus securely fastened. An end of the chain is disposed over the pipe and inserted in recess 38. Turning handle 46 and thus bolt 42 within its threaded recess 40 will tighten the chain and each vise will apply three point pressure upon the pipe. In this manner a pipe may be rapidly yet securely fastened within these vises.

The carriage 16 includes a carriage base 54 which is mounted upon a channel member 56. This channel member 56 is in turn slidably mounted upon a T shaped guide member 58 the projecting ears of which are disposed within the channels of channel member 56. T shaped guide member 58' is secured to web 18 of frame leg 22 by means of bolts 60', and in this manner the carriage 16 is mounted for sliding movement longitudinally of leg 22, and may be accurately guided therealong in its movement. A pair of spaced clamps 58 are mounted upon carriage base 54, and are tightened by means of bolt 60.

Power cutting means 14 includes a motor 62 which is securely retained by clamps 58, so that the power cutting means is thus mounted for longitudinal movement with the carriage. A high speed cutting head 64 is provided on the driven shaft 66 of motor 62. Upstanding leg 24 of the frame 10 has a reinforcing block 68 with a threaded opening 70 formed therethrough into which an adjusting screw 72 is mounted. This screw has a handle 74 on the outer end thereof. The free end of this screw is smooth, and is mounted for rotation but not longitudinal movement with respect to block 76 fastened to the rear end of motor 62, so that by turning handle 74 and thus the screw 72, the motor 62 is moved forwardly or rearwardly in the direction of carriage movement, so as to feed and retract the cutting head 64 toward and away from the pipe vises.

Cutting head 64 is provided with a plurality of inclined slots 78 which are non-radial, and into which cutters 80, having cutting edges 82, are adjustably mounted. The shape and position of cutting edges 82 determine the shape of the bevel or other facing cut which is made in the end of the pipe. Recesses 84 are also provided in the cutting head through which set screw openings 86 are provided in which set screws 88 are threadably mounted. It may thus be seen from FIG. 5 that by tightening the set screws the cutters 80 are firmly retained in position within slots 78. The relative inclination of each of the cutters with respect to the axis of rotation of the cutter head may also be adjusted. In the forward end of the cutter head a mandrel 90 is provided which is fluted and acts as a combination pilot and reamer during the operation of the device.

It is thought that the operation of this device will now be apparent, but to facilitate an understanding of the device the operation thereof will now be explained. Assume that the device is to be used horizontally as illustrated in FIG. 2, and mounted in a stationary vise. In this event, the length of pipe which is to be beveled or finished in any other manner, will be inserted into the pipe vises 34 and secured therein as mentioned above. Then, after motor 62 has been energized, handle 74 is turned so that the cutting power means 14 is moved toward the end of the pipe. As the cutter head 64 approaches the pipe the mandrel 90 is inserted into the pipe, and, since the cutter head 64 is now rotating at high speed, as the cutting edges 82 of cutters 80 engage the outside of the pipe they will begin the cutting operation and will continue this cutting until the end of the pipe contacts the forward surface 92 of the cutting head. At this time forward feeding of the power cutting means is no longer possible due to the abutting relationship of the end of the pipe against the surface 92. The pipe operated upon during this cutting operation has an absolutely straight edge when bevels are cut, and a smoothness which is equal to that of a watch case. This is very important in accomplishing successful welding especially "heliarc" welding because the slightest inaccuracy in this welding operation will show up in the X-ray examination which each welded joint must pass.

If desired, the tool may be used on a pipe which is already installed in a piping system, as illustrated in FIG. 1. In this case, the pipe vises engage the pipe and actually support the tool thereon during operation.

This device may be used for beveling, scarfing, or machining the ends of stainless steel pipe, or for producing this same effect on other types of pipes such as carbon steel, chrome alloy steel, aluminum, etc. The device is particularly useful in the construction of high pressure or high temperature piping systems. In one embodiment which was actually constructed, the device weighed about twenty pounds. It is thus sufficiently light to be readily transportable to any part of a building and render it unnecessary to remove a pipe for a repair or a cut in a piping system, since the device may be mounted to a pipe as illustrated in FIG. 1. The device may be mounted as close as two inches from any structural member. A good welding operator can weld a joint which is within one inch or less from a wall, floor or ceiling, so that the device is extremely useful, even when there are space limitations. It has been found that the carriage may be advanced or retracted by using a single finger, and the cutting is so quick that this manual feeding of the cutting head is perfectly sufficient, and power means for such a purpose would be superfluous.

The cutting heads themselves weigh less than two pounds and are interchangeable to suit any diameter or schedule of pipe. Also, if a different diameter pipe is to be used, the height of shim 32 must be changed, and therefore a different shim will be inserted so as to assure that the axis of the pipe being worked upon will be coincident with the rotational axis of cutting head 64. Any type of cutting head can be supplied to make any kind of scarf, bevel, or land desired (U joints, and J joints for heliarc and thirty-seven degree angle joints for arc welding). Heads are also interchangeable or adjustable to suit any size pipe from one-half inch to and including two and one-half inches, and in one operation in which this tool was used the lands were fifty-thousandths of an inch. When the cutting heads were tested on stainless steel schedule 160 pipe they made over one thousand bevels before any signs of wear appeared and regrinding was necessary. The sharpening of the cutting heads is as simple as the sharpening of a simple twist drill. In order to replace or reset the cutting heads a gauge may be used which will vary depending upon the size of pipe used. Such a gauge will assure positive alignment of all the cutting tools. During the actual use of this device it was found that a piece of one inch stainless steel schedule 160 required a mere thirty seconds for completion of the beveling operation.

The foregoing is considered only as illustrative of the principles of the invention. Further, since numerous minor modifications and changes will readily occur to those skilled in the art, it is not desired to limit the invention to the exact construction and operation shown and described, and accordingly all suitable modifications and equivalents may be resorted to, falling within the scope of the appended claims.

I claim:

1. A portable pipe cutting tool assembly for preparing the ends of pipes for further operations such as welding and the like, comprising a frame adapted for mounting in a stationary vise, a clamping assembly including a plurality of axially aligned and spaced pipe clamps mounted on one end of said frame for simultaneously releasably clamping a pipe, power cutting means on said frame having a cutting head rotatably mounted about an axis coincident with the axis of a pipe held in said pipe clamps, a carriage accommodating said power cutting means and mounted for longitudinal sliding movement in the direction of said axis, and mechanical means for selectively moving said carriage and consequently said power cutting means along said axis to feed and retract said cutting head with respect to the end of a pipe mounted in said pipe clamps, whereby the pipe end may be cut by said cutting head.

2. The assembly of claim 1, wherein said frame is L shaped, said carriage moving means including a threaded bolt mounted at the opposite end of the frame from the pipe clamps and disposed coaxial with said axis.

3. The assembly of claim 1, wherein said pipe clamping assembly includes a plate on which said pipe clamps are mounted, means for detachably connecting said plate to the forward end of said frame, and a shim interposed between said frame and said plate and being removable to be replaced by shims of different size to arrange a pipe in said clamps so its axis coincides with the axis of rotation of the cutting head, whereby the tool assembly may accommodate pipes of various size.

4. The assembly of claim 3, wherein said cutting head includes a body having a forward surface for abutment with the end of a pipe in said clamps to limit the amount of cutting of such a pipe, and a mandrel having a tapered front end for properly positioning the cutting head with respect to such a pipe when the cutting head is fed theretoward by said carriage moving means.

5. A tool as defined in claim 3 wherein each of said pipe vises is provided with pipe engaging surfaces which are spaced about the entire circumference of a pipe held therein.

6. The assembly of claim 4, wherein said cutting head body has cutter accommodating slots therein which are offset from radial positions, cutters disposed in said slots, said mandrel having a rearward portion of uniform diameter in radial alignment with said cutters to provide an internal bearing for pipe being cut, and means for adjustably retaining the cutters in said slots with the cutting edges thereof disposed forwardly of said body.

7. The assembly of claim 6, wherein said cutter retaining means includes a recess for each slot having a threaded opening in communication with a slot, and set screws in said openings for selectively retaining the cutters in their slots in any desired position, whereby the inclination and forward projection of the cutters may be varied.

8. A tool as defined in claim 7 wherein said cutters each include a rounded, pipe-facing cutting surface with the rounded portion thereof starting in the vicinity of said abutment surface.

References Cited in the file of this patent

UNITED STATES PATENTS

| | | |
|---|---|---|
| 466,728 | Smith | Jan. 5, 1892 |
| 2,188,584 | Tyne | Jan. 30, 1940 |
| 2,492,783 | Chamberlain | Dec. 27, 1949 |
| 2,583,917 | Wiegant | Jan. 29, 1952 |
| 2,719,461 | Hawker | Oct. 4, 1955 |
| 2,948,196 | Branday | Aug. 9, 1960 |